(No Model.) 3 Sheets—Sheet 1.

W. K. ELSON.
MANUFACTURING ARTICLES OF GLASSWARE.

No. 452,452. Patented May 19, 1891.

WITNESSES

INVENTOR (No Model.) 3 Sheets—Sheet 2.
W. K. ELSON.
MANUFACTURING ARTICLES OF GLASSWARE.

No. 452,452. Patented May 19, 1891.

WITNESSES
Arthur A. Orb
C. S. Champion.

INVENTOR
Wm K. Elson by
Frank L. Dyer
Attorney (No Model.) 3 Sheets—Sheet 3.
W. K. ELSON.
MANUFACTURING ARTICLES OF GLASSWARE.
No. 452,452. Patented May 19, 1891.
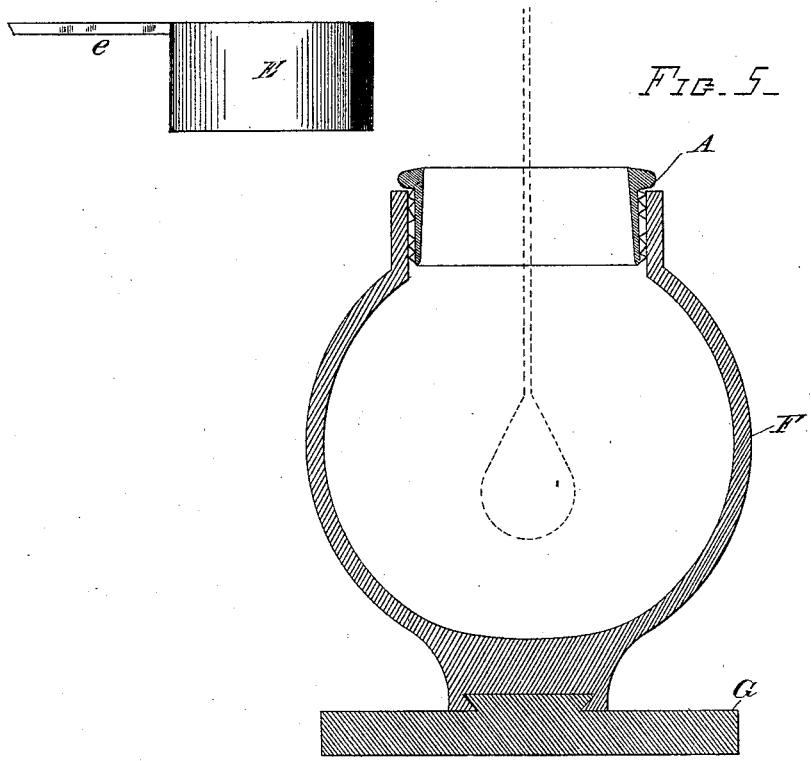
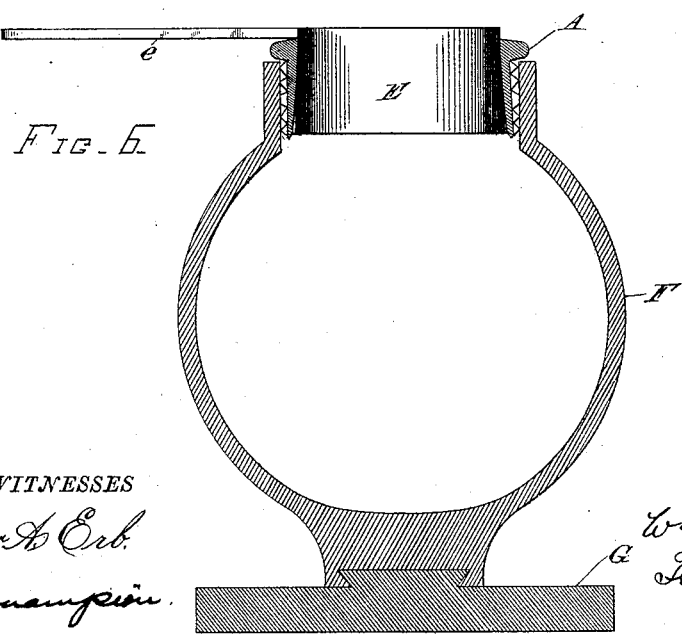
WITNESSES
Arthur A. Erb.
C. S. Champion.
INVENTOR
Wm. K. Elson by
Frank L. Dyer
Attorney

UNITED STATES PATENT OFFICE.

WILLIAM K. ELSON, OF MARTIN'S FERRY, OHIO.

MANUFACTURING ARTICLES OF GLASSWARE.

SPECIFICATION forming part of Letters Patent No. 452,452, dated May 19, 1891.

Application filed March 6, 1891. Serial No. 384,025. (No model.)

*To all whom it may concern:*

Be it known that I, WILLIAM K. ELSON, a citizen of the United States, residing at Martin's Ferry, in the county of Belmont and State of Ohio, have invented certain new and useful Improvements in Processes for Manufacturing Articles of Glassware; and I do hereby declare the following to be a full, clear, and exact description of the invention, which will enable others skilled in the art to which it appertains to make and use the same.

My present invention relates to an improved process of manufacturing articles of glassware, which consists, generally, in pressing the neck, and then in welding the body of the article to the neck in a separate mold at the same time that the body is being blown.

By means of my improved process I am enabled to form articles of glaseware having ornamental necks, if desired, which will possess all the beauty and strength of pressed ware.

For a better comprehension of my improved process it will be necessary to understand the action of the various molds in carrying it out, and which are illustrated in the accompanying drawings, forming a part of this specification.

Figure 1:
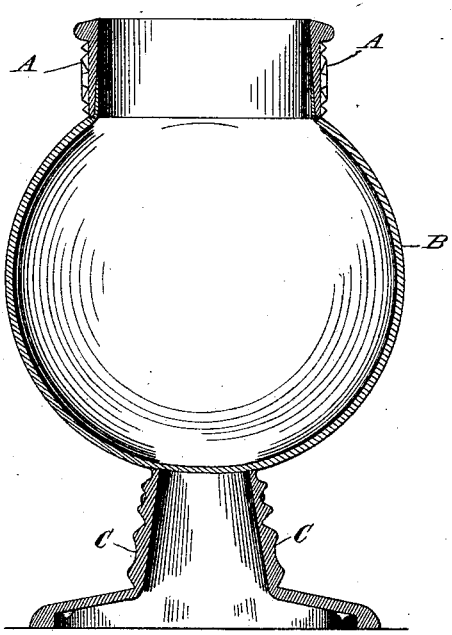
Figure 4:
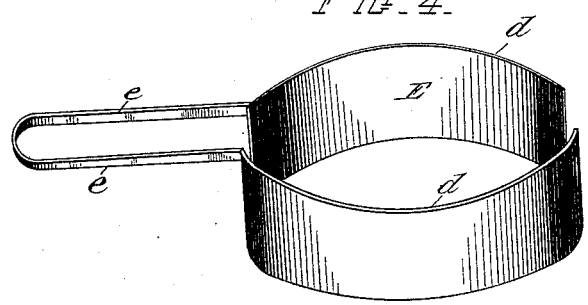
Figure 2:
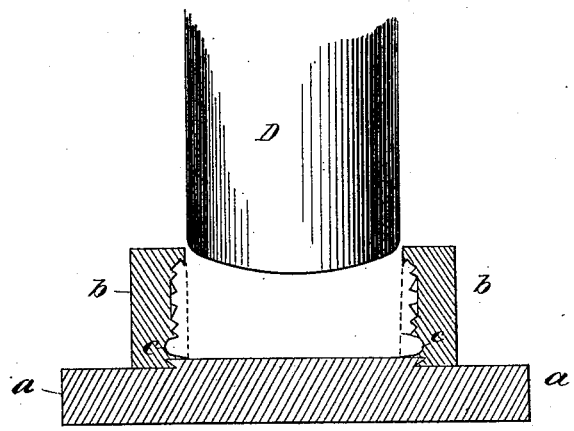
Figure 3:
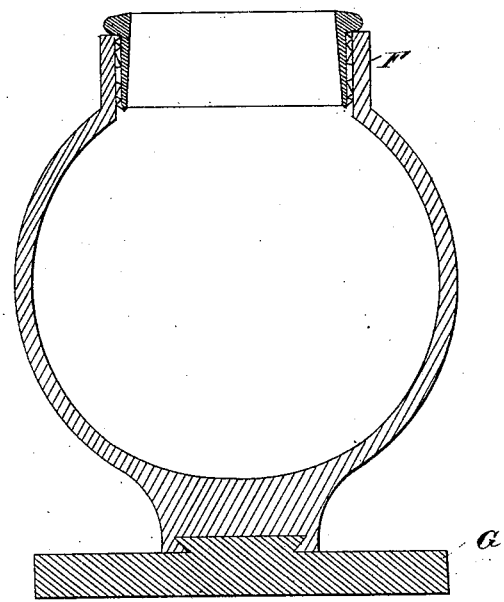

In the drawings, Figure 1 is a sectional view of an ordinary ornamented jar made in accordance with my improved process; Fig. 2, a sectional view of the plunger-mold for making the neck of such a jar; Fig. 3, a sectional view of the mold for making the body of such a jar; Fig. 4, a perspective view of the tongs for handling the neck; Fig. 5, a sectional view showing the bloom in the mold with the tongs removed, and Fig. 6 a sectional view showing neck and tongs in place.

In all the above views corresponding parts are designated by identical letters of reference.

The jar which is shown in Fig. 1 is provided with a neck A, which is pressed in a suitable mold, and with a body B, which is blown in another mold and simultaneously welded to the neck, and with the base C, which is also welded to the body at the same operation.

The present invention has no reference to the attachment of the base to the body at the same time that the body is being blown, since such a process is old; but it relates simply to the welding of the blown body to the pressed neck.

In Fig. 2 is shown the mold for pressing the neck. This mold is provided with an ordinary base $a$ and with a hinged body $b$, having its interior of the proper shape. In this view I have shown the body with a recess $c$, whereby a bead at the upper portion of the neck may be formed. The interior of the body $b$ below this recess $c$ is made somewhat smaller than the rest of the body, so that when the plunger D enters the mold it will form a very fine film on the top of the neck, which may be easily ground or broken off. The neck is made in a manner well known to glass-workers, as follows: A small portion of bloom is dropped within the body B, and the plunger D is introduced, so as to force the glass into the position shown on the dotted lines. The neck of the article is therefore pressed while in an inverted position; but it will be understood that it may be pressed in an upright position. In order that a larger welding-surface will be offered at the bottom of the neck, it is preferably made of an apex shape, as shown. As soon as the neck has been pressed the body $b$ of the mold is opened and a pair of tongs E is introduced, so as to engage with the neck. These tongs consist of two metallic semicircular plates $d$ $d$, which are normally separated for a considerable distance by means of the spring-handle $e$. In introducing the sections $d$ $d$ inside the neck the handle $e$ is contracted, so as to bring the sections $d$ $d$ together, and when the sections are within the neck the handle $e$ is allowed to expand, so that the sections $d$ $d$ will spread and engage with the inside of the neck, which can thereby be easily lifted. The neck A is now lifted by means of the tongs E and placed in the upper portion of the mold, as shown in Fig. 3. This mold is an ordinary sectional mold F, mounted upon a base G. This mold is not shown as being adapted to receive the base C of the article, since the method of welding the base to the body is old. The neck A having been placed in the upper part of the mold F, an ordinary blowing-tube is introduced down through the neck with the requisite quantity of molten glass thereon. The tongs E are left in position upon the neck while the molten glass is being introduced within the mold F in order that such molten glass may not come into contact with the neck, for if such an occurrence should take place the bloom would become immediately welded to the neck. As soon as the bloom has been introduced within the mold F the tongs E are removed, and the bloom within the mold F is blown so as to fill the mold and become firmly welded to the lower portion of the neck, as shown in dotted lines. As soon as the glass has been blown within the mold F the blowing-tube is withdrawn, so as to carry with it a fine film of glass, called the "blow-over," which will adhere to the inside of the neck A, and thus effect a very perfect fusion between the neck A and the body B. The mold F is now opened, and the completed article is removed to pass through leers or annealing-ovens in the usual way, after which the upper portion of the neck is ground or smoothed off, as heretofore. If desired, the neck may be smoothed or finished in any suitable way after going into the leers. It will be understood that the neck A may be either plain or ornamented. In this way articles of glassware, such as jars and bottles, can be made with ornamented necks, which has been impossible heretofore, for the reason that it has been impossible to blow a perfect article having fine ornamentations.

Having now described my invention, what I claim as new therein, and desire to secure by Letters Patent, is as follows:

1. An improved process of making articles of glassware, which consists in pressing the neck-ring in a mold, introducing the pressed neck-ring into a second mold, blowing the body of the article within the second mold, so as to weld it to the neck, and in bringing the blow-over up through the neck, so as to fuse it thereto, substantially as set forth.

2. An improved process of making articles of glassware, which consists in pressing the neck in an inverted position, in introducing a pair of tongs E, substantially as described, within the neck, in transferring the neck to a second mold, and in leaving the tongs within the mold, whereby the tongs act as a shield, in introducing a blowing-tube within the second mold, and blowing the body of the article so as to effect a weld between the body and the pressed neck, substantially as described.

WILLIAM K. ELSON.

Witnesses:
ARTHUR C. CLARKE,
ARTHUR A. ERB.